United States Patent [19]
Kirk

[11] 3,938,081
[45] Feb. 10, 1976

[54] CIRCUITRY FOR PREVENTING THE USE OF ERRONEOUS DATA

[76] Inventor: Robert T. Kirk, 115 S. 350 West, Bountiful, Utah 84010

[22] Filed: May 21, 1974

[21] Appl. No.: 471,927

Related U.S. Application Data

[63] Continuation of Ser. No. 356,889, May 3, 1973, abandoned, which is a continuation of Ser. No. 216,318, Jan. 10, 1972, abandoned.

[52] U.S. Cl. .................. 340/146.1 R; 214/16.4 A
[51] Int. Cl.² .................................. G06F 11/00
[58] Field of Search ............. 235/153 AE, 153 AH; 340/146.1 BA, 146.1 BE, 146.1 R, 172.5; 214/16.4 A

[56] References Cited
UNITED STATES PATENTS

| | | | |
|---|---|---|---|
| 3,356,837 | 12/1967 | Raymond | 340/146.1 BE |
| 3,386,081 | 5/1968 | Varsos | 340/146.1 R |
| 3,396,369 | 8/1968 | Brothman et al. | 340/146.1 R |
| 3,562,708 | 2/1971 | Verbarg et al. | 340/146.1 R |
| 3,568,147 | 3/1971 | Gilson | 340/146.1 R |
| 3,593,307 | 7/1971 | Gouge, Jr. et al. | 340/172.5 |
| 3,595,412 | 7/1971 | Billingsley et al. | 214/16.4 A |
| 3,646,890 | 3/1972 | Snyder | 214/16.4 A |
| 3,782,565 | 1/1974 | Doran et al. | 214/16.4 A |

*Primary Examiner*—Charles E. Atkinson

[57] ABSTRACT

A transceiver for computer controlled stacker cranes comprising an interface which controls the voltage level of incoming and outgoing serial signals, a sampling circuit and a voting circuit which together prevents transmission of transient or improper signals received from the interface, shift registers converting incoming serial data to parallel data and also converting stored parallel data to outgoing serial data, a temporary storage memory which holds parallel data received from the shift registers until commanded by timing signals to output said data, an end of transmission decoder which senses the end of a data message and triggers certain timing signals, timing circuitry for clocking transfer of data to and from said memory, and circuitry for preventing simultaneous transmission and reception of data.

2 Claims, 5 Drawing Figures

CIRCUITRY FOR PREVENTING THE USE OF ERRONEOUS DATA

BACKGROUND

Continuity

This application is a continuation of my U.S. Ser. No. 356,889, filed May 3, 1973, now abandoned, which in turn was a continuation of U.S. Ser. No. 216,318, filed Jan. 10, 1972, now abandoned.

FIELD OF INVENTION

This invention relates generally to the field of communications and more particularly to a transceiver for use with computer controlled stacker cranes.

In automated stacker crane systems, it is customary to use computers which employ parallel digital data, i.e. a central processing computer as well as a stacker crane controller. Data communicated between the central processing computer and a crane computer is normally transmitted in a serial manner. Thus, provision must be made for converting the parallel data coming from either the central processing computer or a crane computer to serial data. Likewise, serial data to be received by either the central processing computer or a crane computer must be converted to parallel data. Both requirements can be obtained and considerable money, weight and space saved by using a transceiver.

PRIOR ART

Numerous types of transceivers have been proposed heretofore. However, none of the prior art devices has been entirely satisfactory. Some of the prior art transceivers have been extremely bulky, complex and expensive. Others have served only to communicate and have required the use of additional equipment to convert between serial and parallel data. Additional prior art transceivers have been unable to discriminate against random pulses, such as noise.

BRIEF SUMMARY AND OBJECTS OF THE INVENTION

The above-mentioned disadvantages of the prior art are overcome or substantially alleviated by the present invention which provides a transceiver which is relatively simple and inexpensive, yet provides for conversion between serial and parallel data and comprises novel sampling and voting circuitry for distinguishing between data and noise signals.

The advantages of the present system are preferably attained by providing a transceiver comprising a central processing computer, a stacker crane with computer, sampling and voting circuitry, serial data memory, parallel data memory and timing and control circuitry, whereby noise is rejected and parallel data from the crane computer or central processing computer is converted to serial data and vice versa.

Accordingly, it is a primary object of the present invention to provide an improved transceiver for transferring data between a computer and one or more stacker cranes.

Another significant object of the present invention is to provide a transceiver which converts parallel data from a crane or a computer to serial data, and vice versa.

An additional object of the present invention is to provide a transceiver including sampling and voting circuitry for preventing passage of transient or erroneous signals.

Another paramount object is the provision of a plurality of transceivers each with a parallel data storage memory, at least one transceiver being used in conjunction with each of a plurality of stacker cranes and a single central processing computer controlling all of the stacker cranes.

A further and also important object of the present invention is the provision of an extremely simple and efficient interface between a computer which controls a stacker crane and a transceiver.

These and other objects and features of the present invention will be apparent from the following detailed description, taken in reference to the accompanying drawings.

DETAILED DESCRIPTION OF ILLUSTRATED EMBODIMENT

Figure 1:
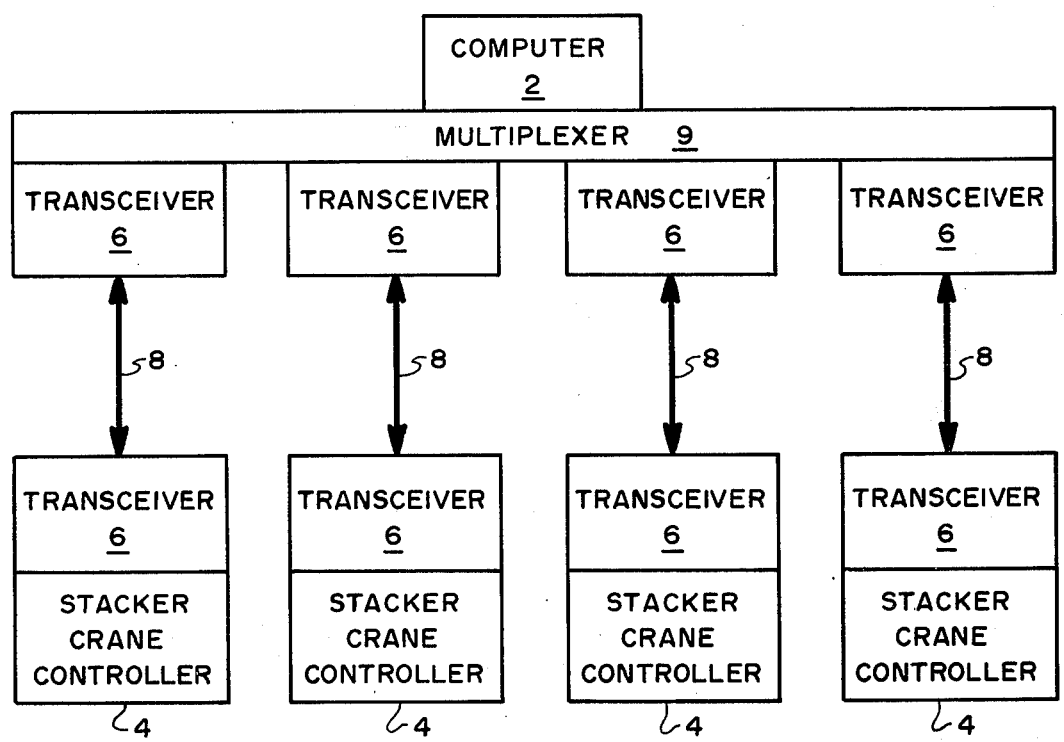
FIG. 1 is a diagrammatic representation of a system utilizing transceivers according to the present invention whereby a central processing computer controls the function of one or more stacker cranes.
Figure 3:
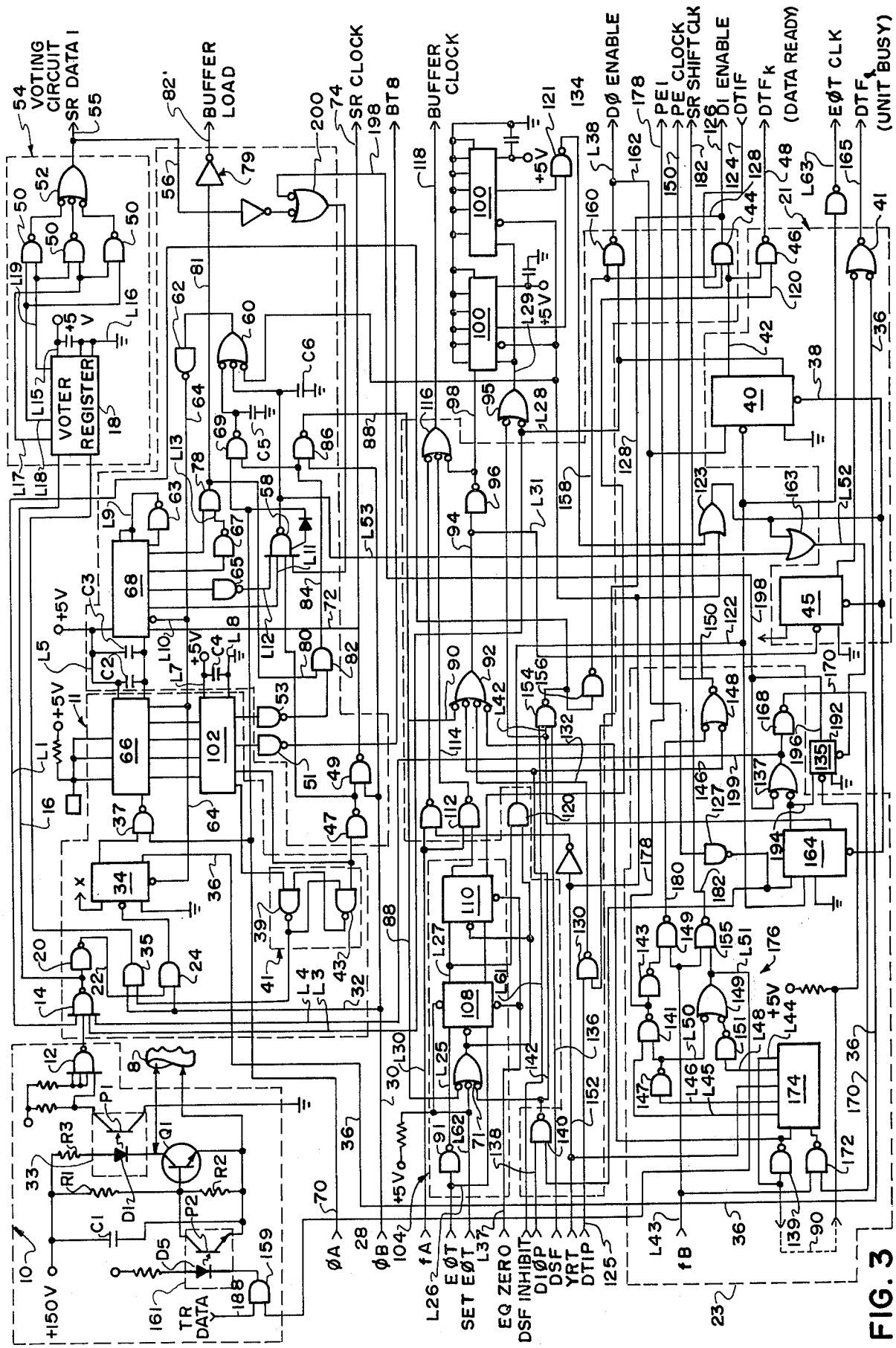
FIG. 3 is a circuit diagram of the control portion, including sampling and voting circuitry, of the transceiver.
Figure 4:
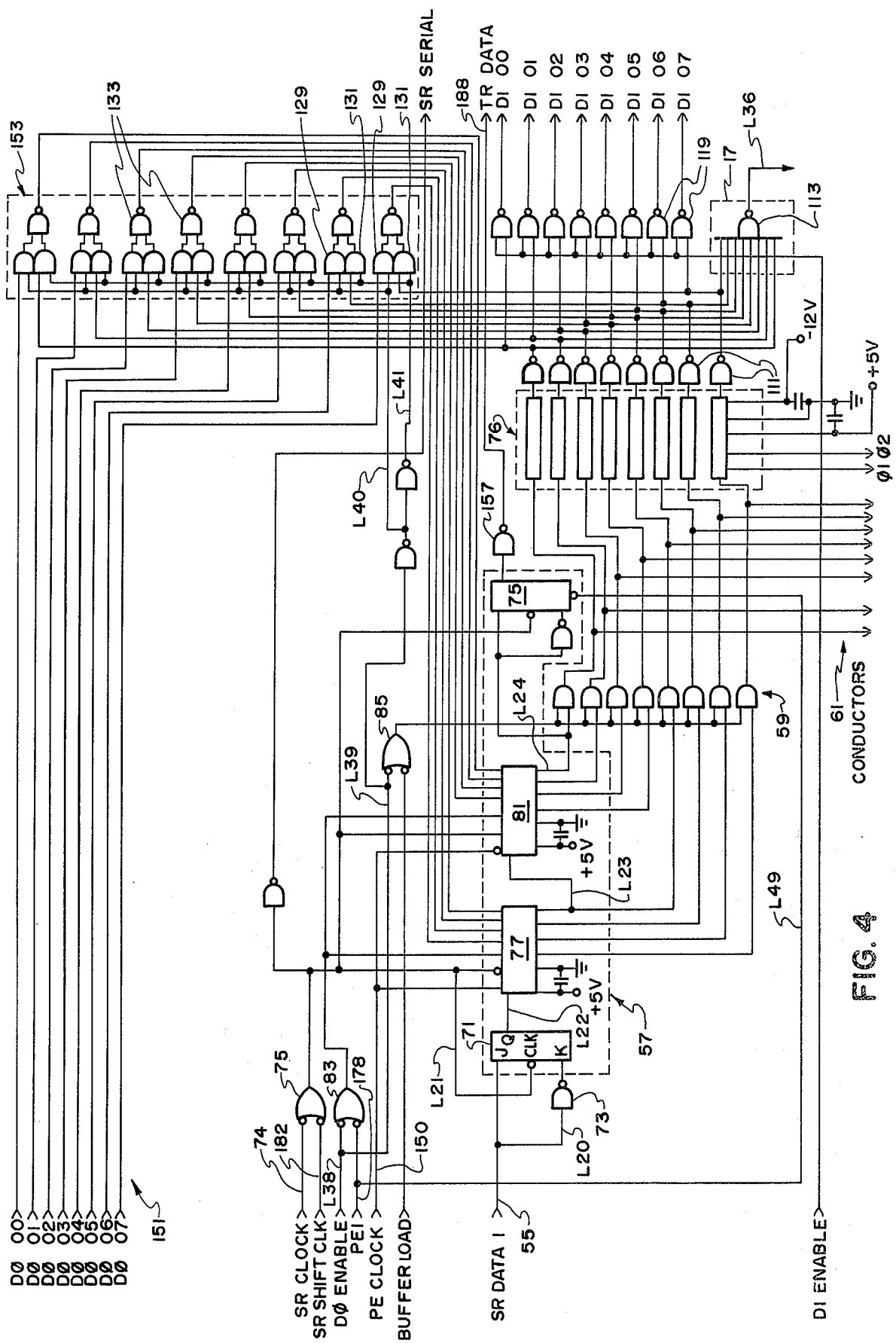
FIG. 4 is a circuit diagram of the serial data memory and the parallel data memory of the transceiver.
Figure 5:
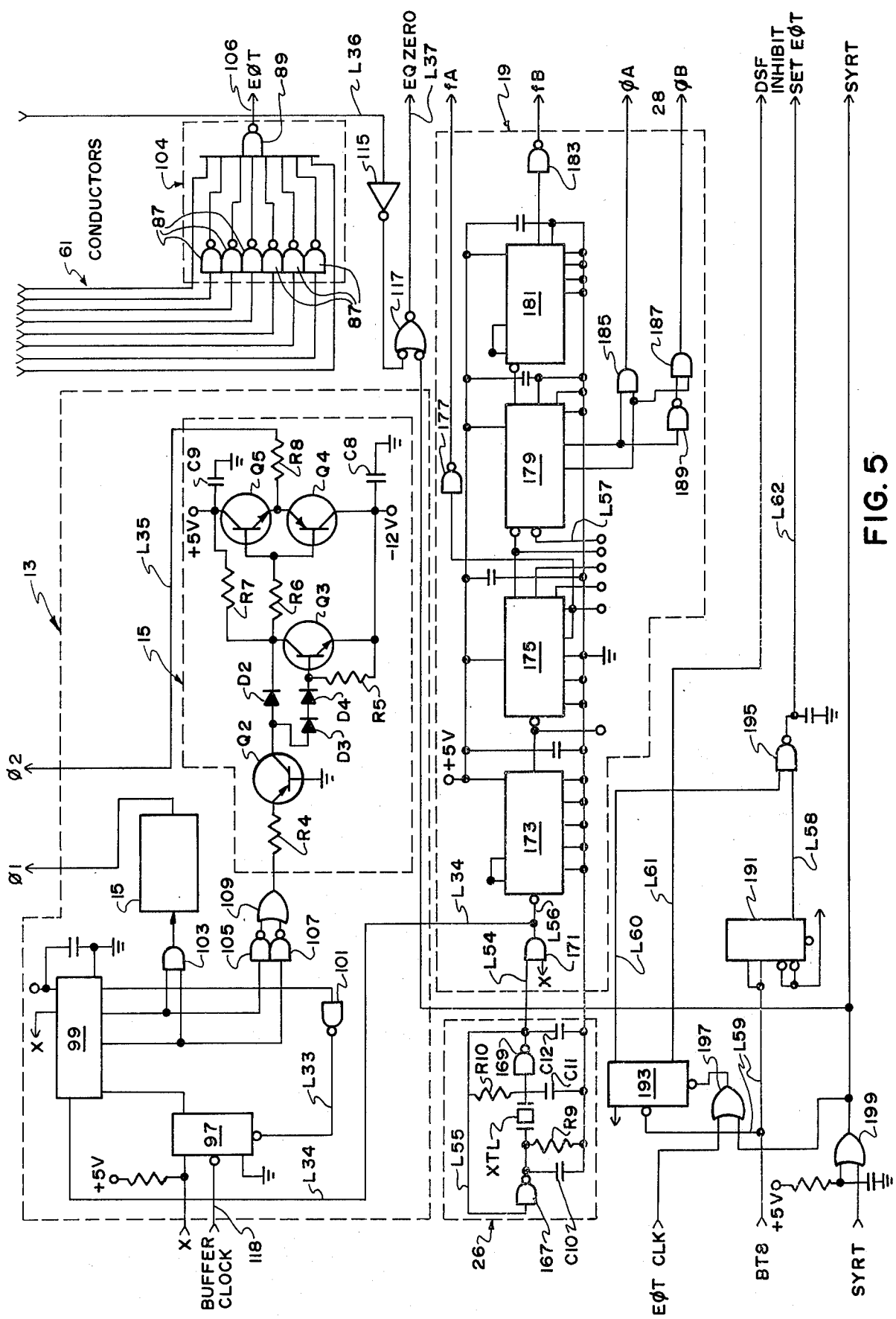
FIG. 5 is a circuit diagram of the timing and control portions of the transceiver.

In that form of the present invention chosen for purposes of illustration, FIG. 1 shows a warehousing retrieval system comprising a computer 2 and a plurality of stacker crane controllers 4, each controlled by the computer 2. In order for the system to function, it is necessary that communication be maintained between the computer 2 and each stacker crane controller 4. Thus, the computer 2 may transmit command to any or all of the stacker crane controllers 4 and may receive status reports from each stacker crane controller 4. To accomplish this, the computer 2 and each of the stacker crane controllers 4 may be provided with a transceiver 6, the principal purposes of which are to eliminate transients and to convert signals received from the computer or any stacker crane controller from parallel to serial and data transmitted to the computer or any stacker crane controller from serial to parallel data. Additionally, each transceiver 6 provides a parallel data memory which stores parallel data in readiness for the computer (or a stacker crane controller) until such time as the computer is available and ready to accept the data. Adjacent transceivers 6 are connected to transmit and receive messages via a transmission line 8 or the like. Preferably, all of the transceivers 6 are identical and are constructed as illustrated in FIGS. 3-5. For simplicity, only one transceiver 6, as it relates to an adjacent stacker crane controller 4 will be described, but it is to be appreciated that the self same transceiver can and is used in conjunction with the computer 2 in an essentially identical manner.

Figure 2:
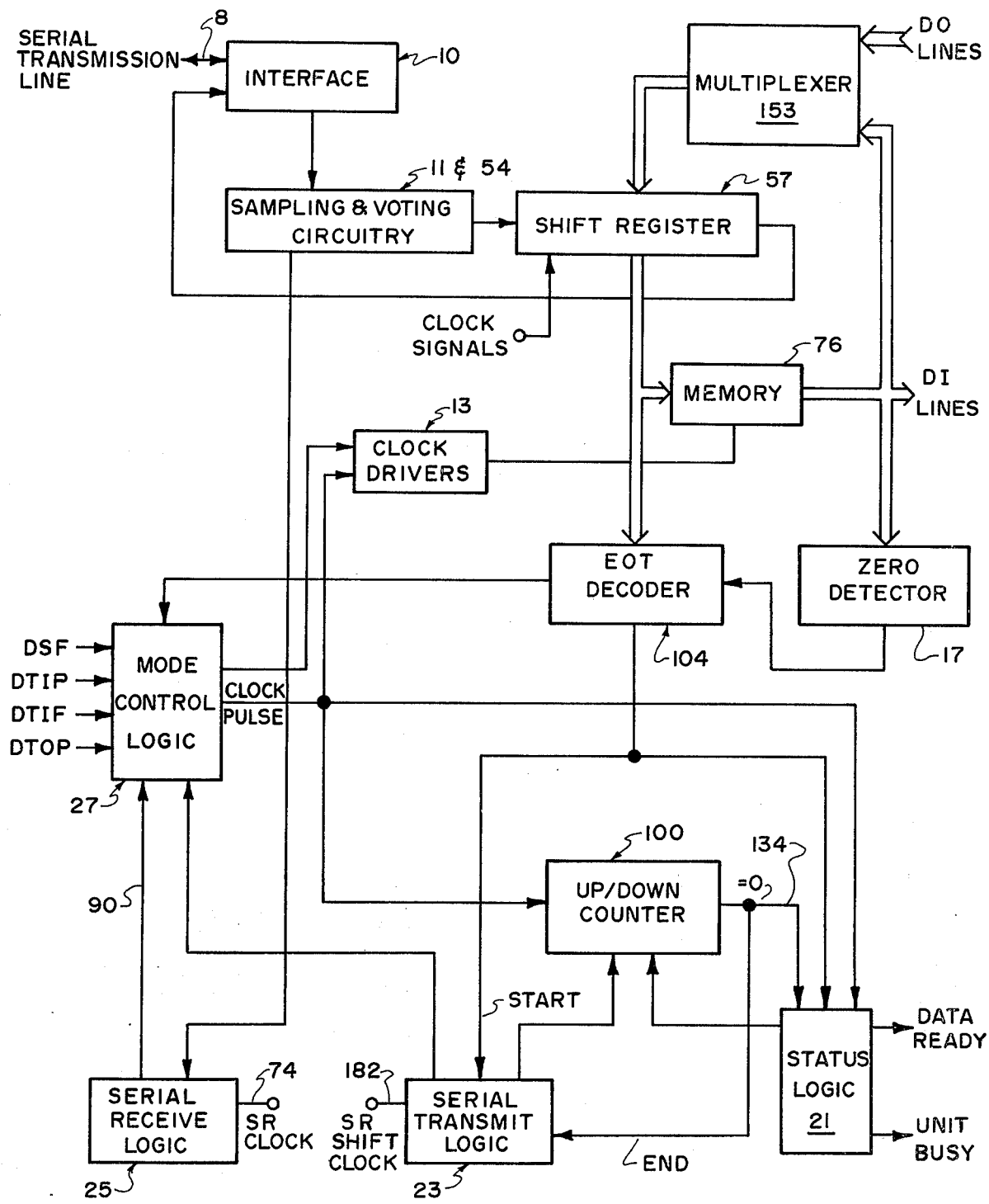
FIG. 2 is a functional diagram of the transceiver of FIG. 1.
Figure 2:
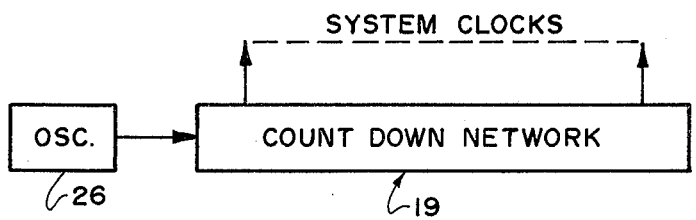

With specific reference to FIG. 2, in reference to the serial input mode thereof, it is to be appreciated that signals to or from the interface 10 are communicated along transmission line 8. This is a functional description and not necessarily a completely accurate hardware description. The interface 10 is a photocoupling line isolation circuit which optically transfers signals between high voltage and low voltage portions of the system, and avoids any need to couple the various ground lines up the system together, which eliminates noise. The circuit 10 is more fully described in U.S. Pat. No. 3,801,837 to which reference may be made.

Sampling circuit 11 and voting circuit 54 receive low voltage signals from interface 10 and communicate the verified ones of those signals to memory 57 which comprises a series of shift registers. The specific manner in which the sampling and voting circuits function is to test the first incoming signal to determine if it is a zero or a one. If it is a logic zero the remaining signals of series are accepted and acted upon. If it is determined by circuits 11 and 54 that the signal is a logic one the circuit resets and awaits the next zero. At the end of each bit of data, circuitry 11 and 54 transmits a signal to serial receiving logic 25 which increments a bit counter thereof from which it is determined when the loading function to the memory 57 has been completed.

Data voted upon by circuits 11 and 54 is serially clocked into and stored within memory 57 from which it is output to parallel data memory 76. This is done following the issuance of a signal along conductor 90 from serial receive logic 25, once loading of memory 57 has been completed, to the mode control logic 27 from which a clock pulse is issued to the clock driver 13 which in turn clocks memory 76 for receipt of the data from memory 56. The same clock pulse issued from mode control logic 27 causes the status logic 21 to issue a UNIT BUSY signal which prevents conflicting use of the system. Also, the same clock pulse causes the up/down counter 100 to count up one character, the up/down counter 100 having been previously set to count up by reason of the absence of signals from the serial transmit logic 23 and the status logic 21.

When the end of message has occurred, in the typical situation, memory 76 is only partially loaded and zero detector 17, which monitors the output state of memory 76 continues to indicate a zero, even though the end of message has occurred. This state is conveyed through EOT decoder 104 to the mode control logic 27 causing issuance in rapid fashion of clock pulses through clock driver 13 shifting the data partially filling the memory 76 to a location where the initial bit is ready to be output at which time the detector 17 senses a non-zero character and this continues clocking of the data in memory 76.

Once the end of the message transmitted from memory 57 to memory 76 is transmitted, the same is sensed by the end of transmission (EOT) decoder 104, which in turn signals the status logic 21 that transmission has ended following which the status logic 21 issues a DATA READY signal and also signals the up/down counter 100 to count down thereafter.

This concludes the serial input mode of the system.

At this point in time, the system is ready to proceed with the parallel output mode of its operation. Once the DATA READY signal has issued from the status logic 21, the DSF (device select function) signal is caused to go high and the DTIF (data transfer in function) and the DTIP (data transfer in pulse) signals are communicated at essentially the same time from the computer to the mode control logic 27 indicating that the computer has read the first character available from memory 76 on the DI lines and is ready to read the next character. Each character thereafter is read by the computer as a result of clocking pulses issued from the mode control logic, which at the same time counts down counter 100. This procedure continues until counter 100 reaches zero at which time the output of counter 100 is at a logic zero which resets the status logic clearing the DATA READY and the UNIT BUSY signals. At this point in time the parallel output mode of operation has been completed and the system is ready to either output data from the stacker crane controller via multiplexer 153 or to receive additional data from the computer via transmission line 8 at interface 10. The system may be operated in a parallel input mode such that information from the stacker crane controller is transmitted via the multiplexer 153 and shift register memory 57 to the central processing unit 2. Upon sensing that there is no UNIT BUSY signal, the stacker crane controller issues a DSF signal establishing the parallel input mode of operation at mode control logic 27. The DTOP (data transfer output pulse) is also communicated to the mode control logic 27. Clock pulses are issued therefrom incrementing the counter 100 and causing clock driver 13 to load memory 76 as signals from the stacker crane controller are processed through multiplexer 153 and shift register 57. Once the DTOP signal is received the status logic 21 issues the UNIT BUSY signal. Once the message from the stacker crane controller has been received at memory 76 it is displaced to the output in the previously described manner. At this stage, there is no DATA READY signal, the signal being inhibited by the mode control logic 27.

At this juncture in time, memory 76 and the remainder of the system is ready to be operated in the serial output mode. The apparatus is set in the serial output mode at the conclusion of the message being delivered to memory 76 as a result of the signal issued from the EOT decoder 104 to the serial transmit logic 23 which changes the counter 100 to the down count mode. As a result, the serial transmit logic 23 enables the memory 76 to shift data therefrom into memory 57. The SR SHIFT clock pulse issuing along conductor 182 causes the first character stored in memory 76 to be loaded into memory 57, memory 57 being in the serial mode of operation thereof as opposed to the parallel load mode. Thereafter, clock pulses from serial transmit logic 73 to shift register memory 57 cause the character stored therein to be communicated through interface 10 to the central processing unit 2 along transmission line 8. The described communication of characters from memory 76 to memory 57 and from 57 to the central processing unit continues until the counter 100 reaches an output condition of logic zero at which time the UNIT BUSY signal is cleared and the serial transmit logic 23 is reset and the system is in a condition to function in either the serial input mode or the parallel input mode.

With particular reference to FIG. 3, signals received from transmission line 8 are applied through the interface 10 to data NAND gates 12 and 14 in the serial input mode. More specifically, when transmission line 8 is at ground potential, transistor Q1 is off, current from the 150 volt source is caused to flow across diode D1 of the solid state photocoupling unit 33, capacitor C1 functioning to stabilize potential of the circuit resistors R1 and R2 serving as bias resistors for transistor Q1 and resistor R3 serving as a load resistor for the transistor Q1. Current flow across light emitting diode D1 causes an optical signal to pass to phototransistor P1 where the optical signal is converted to the electrical signal communicated to the schmidt trigger comprising NAND gate 12 causing the output thereof to go high with the voltage at P1 low. For the output of NAND gate 14 to be functional, it must be a low voltage signal requiring that all inputs be high. Thus, the signal on line L1 must be high, a state occurring when the DSF signal at line 136 is preset to a low voltage state resulting in a high state on line L1. Also, the voltage on lines L3 and L4 must also be high. The voltage on line L3 is high when the data ready flip-flop 40 is reset or off indicating the data is not ready while the voltage on line L4 is high when the system is not in the serial output mode.

The low voltage output signal of NAND gate 14 is communicated to inverter 20 and to the volting circuit 54 where the signal is voted upon on a two of three basis in a manner hereinafter explained. If the vote is favorable, flip-flop 34 of the sampling circuit 11 continues to operate, i.e. except each high voltage signal emanating from inverter 20 through AND gate 24. The output of AND gate 24 is caused to be high when the output from inverter 20 is high and clock pulses phi B are communicated along line 30 at the rate of 10 pulses per data bit. These same clock pulses are also input to AND gate 35. When the other input to AND gate 35 is positive, the clock pulse is passed through AND gate 35 causing the voting circuit 54 to be clocked. The signal passed by AND gate 24 clocks the flip-flop 34 to a high state allowing clock signals phi A to pass and be inverted by NAND gate 37 to counter 66 which, together with counter decoder 102 breaks each bit of input data into ten segments. All other inputs to counter 66 other than that of gate 37 are retained at a logic one with power being supplied along line L5 to the counter with capacitors C2 and C3 functioning as bypass capacitors and line L6 grounding the counter 66. Four of the counter outputs are connected to the decoder 102 and one being connected to line 64. The decoder 102 is wired to NAND gate 39 so as to pass the fourth segment signal, a low signal to gate 39 of latch circuit 41. The decoder is also wired to gate 43 in such a way as to communicate the seventh segment signal thereto. As a result there exists a positive output from latch circuit 41 on the fourth, fifth and sixth segments of a given bit which enables gate 35 allowing the voting circuit 54 to be clocked during that interval of time. In this fashion, the sampling of signals to be voted upon occurs eventually midway through a bit time so that transients and the like ordinarily encountered at the beginning of a bit time are not sampled and reliability is greatly improved.

The decoder is powered along line L7 and grounded at L8, a capacitor C4 being interposed therebetween for the purpose of bypassing noise.

The seventh segment signal communicated to gate 43 is also communicated through gate 47 to gates 58 and 49. If the output from gate 52 of the voting circuit 54 along line 56 is a logic zero when the logic one signal from gate 47 is imposed upon AND gate 58, the output of gate 58 would be a logic one communicating via gates 60 and 62 along line 64 a logic one to flip-flop 34 allows continuation of transmission of data. If to the contrary the output from gate 52 is a logic one, a logic zero appears on line 64 which shuts off or resets flip-flop 34.

When a logic one is communicated from gate 47 to gate 49 a logic zero appears at the output of gate 49 along line 74 producing the SR clock signal which clocks the shift registers of memory 57 in a manner hereinafter more fully described. The mentioned output of gate 49 is also communicated via line 72 to bit counter 68 incrementing the counter to the next bit state. Naturally, a logic zero at the output of gate 49 does not appear unless a clock pulse phi B is communicated to the second input thereof.

It should be noted that segment 8 and segment 9 are respectively communicated through gates 51 and 53. The output of gate 51 is the BT8 signal, while the output of gate 53 is communicated to gate 82.

The same procedure is followed for the next nine bits of information with two exceptions, i.e. the 2–10 bits are not effective through gate 58 for sampling an initial zero bit state and a signal appears during the tenth bit on line 80 causing the output of gate 82 to be positive causing the output of gate 86 to be negative which outputs BUFFER CLK signal along line 118 for the purpose of loading information from memory 57 to memory 76 in a manner more specifically hereinafter set forth.

Bit counter 68 of serial receive logic 25 is powered via line 5 and grounded at line 6. Bit counter 68 is preferably a shift register with a feedback loop L9 which includes NAND gate 63. The output of gate 49 is communicated as an input via line 72 to the bit counter 68 as heretofore described and any reset signal appearing on line 64 is communicated via line L10 to the counter 68 thereby causing it to return to zero count. Outputs from bit counter 68 are communicated directly to gate 58 along line L11, indirectly to gate 58 via inverter 65 along line L12 and to gate 78 via inverter 67. The time interval between outputs appearing on lines L11 and L12 represents bit time one, which is the interval time during which the sampling circuit 11 samples the fourth – seventh segment of said first bit time. The inverted signal passed by inverter 67 on line L13 and the signal on line L14 from bit counter 68 cause a high signal output from AND gate 78. This signal is inverted at 79 to become the BUFFER LOAD signal at line 82' and is also communicated to AND gate 82 causing a positive output signal when the other input signal from inverter 53 is also positive, which output signal is communicated along line 84 to NAND gates 86 and 69. When clock signal phi B is positive that the other input to gate 86 a logic zero appears at the output of gate 86 on line 88 which in turn is input to gate 71 and 92 for purposes later to be explained.

When the second input to NAND gate 69 is positive as a result of a clock pulse phi A, a logic zero exists at the output of gate 69 which is communicated to OR gate 60 causing a reset signal to appear on line 64 as earlier explained. Capacitors C5 and C6 function as signal extending devices.

With reference to voting circuit 54, it should be remembered that serial input data appears on input line 16 to voter register 18 and said data is clocked during fourth, fifth and sixth segments of each bit of information, the voter register being powered by five volt source at line L15 and grounded at L16. As a result, three successive outputs appear on lines L17, L18 and L19 which are input as illustrated to three NAND gates 50. If two or three of the outputs from voter register 18 are high, one or more of the outputs of gates 50 will be high which results in a logic one output at gate 52 comprising the SR DATA I signal at line 55. If, during the first bit of information, a logic zero appears at the output of gate 52, a reset signal occurs on line 64 as described earlier.

With reference to FIG. 4, each SR DATA I signal communicated along line 55 is input to the serial data registers 57 at flip-flop 71. The same signal is communicated along line L20 to the same flip-flop 71 after it is inverted by inverter 73. The third input along line L21 to flip-flop 71 is obtained when SR CLOCK and SR SHIFT CLOCK signals occur on lines 74 and 182 and are passed through gate 75 to line L21 as a logic zero.

It is to be appreciated that the memory 57 is comprised of two one bit shift registers (flip-flops) 71 and 75 together with two four bit shift registers 77 and 81 (each of which comprises four flip-flops). When the J input is high and the K input low of flip-flop 71 the Q output at line L22 will be clocked to a high state when the described signal occurs on line L21. When the K input is high and the J input low, the Q output is clocked low by the signal appearing on line L21. Thus, each clock signal appearing on line L21 will shift data one position from left to right as shown in FIG. 4 in the flip-flops consecutively comprising units 71, 77, 81 and 75, the clocking pulse from gate 75 being communicated to each of the flip-flops. During the serial input mode under consideration the DO ENABLE and the PEI signals input to gate 83 are high which presets the registers 77 and 81 to the serial input mode. Information is passed from shift register 77 to shift register 81 via line L23 and from shift register 81 to flip-flop 75 via line L24, flip-flop 75 being operated in exactly the same fashion as described in conjunction with flip-flop 71.

The described shifting in memory 57 continues until such time as ten bits of information have been received. It is to be appreciated that the first and tenth bits stored in flip-flop 75 and 71 are not meaningful data but only bits 2–9 stored in registers 77 and 81.

As will be recalled in respect to the previous description of serial receive logic 25 the BUFFER LOAD signal is caused to occur on line 82' at the end of the tenth bit of information. This signal together with the DO ENABLE signal are communicated to gate 85 the output of which becomes a logic one which is input to one of the two inputs of each of the eight AND gates 59. The other input to the respective AND gates 59 will be either positive or negative depending upon the data stored in registers 77 and 81. If positive, the output of the associated AND gate 59 will be positive, if negative the output will be negative. Each output of the gates 59 is communicated independently to the decoder 104 along conductors 61 and also to respective MOS segments of memory 76. The MOS segments function essentially as shift registers, receiving the data upon being clocked by signals phi 1 and phi 2. Once the end of message has occurred, in a like fashion the information stored in the segments of memory 76 will be clocked to the output side thereof as later to be more fully described.

With reference to FIG. 5, conductors 61 communicate the output signals from shift registers 77 and 81 to the EOT decoder 104. The decoder comprises a plurality of inverters 87 which invert all but the fourth and ninth bits and input said signals together with the fourth and ninth bit signals to NAND gate 89. On all occasions during message transmission, at least one input to gate 89 will be a logic zero and the output a logic one indicating that the end of message has not occurred. By design, the end of message character will comprise a logic zero output for all bits except bits four and nine which will be at a logic one resulting in all logic one inputs and a logic zero output at gate 89. A logic zero output at line 106 is designated EOT and is communicated from the EOT decoder 104 through inverter 91 (FIG. 3) to flip-flop 108 along line L25 and directly along line L26 to flip-flop 108 for purposes later to be described. The flip-flop 108 operates in a fashion identical to flip-flop 71 earlier described except the clocking pulse at the clock terminal may originate from any one of three sources under the control of gate 71. However, in the serial input mode only the input gate connected to line 88 is effective to clock flip-flop 108 when a logic zero clock pulse occurs. Thus, when the end of transmission has been effected and a clock pulse occurs on line 88 flip-flop 108 will clock to a high output at line L27 and the information contained within flip-flop 108 is transferred to flip-flop 110 upon receipt of the next character which is the final character of the message.

It is to be appreciated when the output at line L27 is transferred from flip-flop 108 to 110 the signal across gate 93 to flip-flop 40 occurs. As a result, the output of flip-flop 40 goes high and a signal issued along line L28 sets counter 100 for counting down by creating a logic one at the output of gate 95 at line L29.

Once the information is transferred from flip-flop 108 to 110 the output of flip-flop 110 is clocked high which output is communicated to gate 112. Thus, upon receipt of a logic one fA clock pulse along line L30 a logic zero clock pulse occurs at the output of gate 112 along line 114 which becomes an input to OR gate 116. It is important to realize that up until an end of transmission signal is created, the logic zero clock pulses occurring along lines 88 and 90 for each character received and input to OR gate 92 are passed as logic one clock pulses to inverter 96 and thereafter input as logic zero clock pulses to increment the up/down counter and to function as an input to OR gate 116, the remaining three inputs to OR gate 92 being inactive during said mode of operation. In the serial input mode prior to receiving an end of transmission signal, the only input to gate 116 is that occurring along line 98 as described, which creates a logic one clock pulse output along line 118, which signal is designated the BUFFER CLOCK signal. Once the end of transmission signal is created, it comprises, during the serial input mode, the only inputs to gate 116 thereby creating a logic one clock pulse along line 118 which is communicated to the clock driver circuit 13, best shown in FIG. 5.

During the serial input mode before the end of transmission signal is generated, the logic one signal at the output of gate 92 is also communicated along line L31 to unit busy flip-flop 45, clocking the output thereof to a logic zero resulting in a logic zero output from gate 41 at line 65 which is the UNIT BUSY/DTF$_1$ signal.

With reference to the clock driver 13 shown in FIG. 5, the logic one clock signal appearing on line 118 is communicated to flip-flop 97 clocking the flip-flop 97 to a logic one output at line L32 which connects with shift register 99 (the shift register 99 comprising a plurality of flip-flops). A feedback line L33 which includes an inverter 101 also connects flip-flop 97 with the last flip-flop of shift register 99. With the output line L32 at a logic one free running clock signals along line L34 from circuit 19 clock logic ones to the three illustrated output positions of register 99, the last logic one signal being fed back along line L33 resetting the flip-flop 97 and resulting in the clocking of zeros into shift register 99 thereafter. The remaining two logic one outputs are communicated respectively to gate 103 in one instance and through inverters 105 and 107 to OR gate 109 in the other instance. Thus, a logic one is communicated from gate 103 to an MOS memory clock driver 15 and a logic zero from gate 109 to a second MOS memory clock driver 15. More specifically, upon receipt by shift register 99 of the first logic one input signal along line L32, gate 109 inputs a logic zero to its associated MOS memory clock driver 15 which input continues until receipt of the second logic zero. When the second logic one is received by shift register 99 the input from gate 103 to its associated MOS memory clock driver changes from a logic zero to a logic one which state continues until the first logic zero is communicated from flip-flop 97 to register 99.

Each MOS memory clock driver 15 functions as now described. If the input thereto is a logic one, transistor Q2 is on as are transistors Q3 and Q4. Transistor Q5 is off resulting in a −12 volt output signal, denominated phi 2.

When the input to the MOS memory clock driver 15 is a logic zero the reverse is true resulting in a logic one 5 volt phi 2 output signal. Diodes D2, D3 and D4 function to prevent saturation of transistor Q3 thereby facilitating more rapid shut off. Resistor R4 is a current limiting resistor, resistor R5 a biasing resistor as are resistors R6 and R7. Resistor R8 serves to slow down fast rise time signals reducing output ringing. The capacitors C8 and C9 are noise bypass capacitors.

As indicated earlier the clocking signals phi 1 and phi 2 are communicated to the respective MOS shift registers of memory 76 and clock a given data message into that memory as described. Once the message has been placed in memory 76 it is desirable to shift the message to the output side of the MOS registers thereof. This is accomplished as described when the fast clock fA signals are rapidly processed through gate 112 and gate 16 after receipt of an end of message signal which, in a very rapid fashion shifts the data to the output and at the same time loads logic zeros received from registers 77 and 81 into the MOS segments of the memory 76. When the data has been shifted to the output side of memory 76 the output of inverters 111 will be the opposite of the data bit at the output of each MOS segment of memory 76. At least one of the signals at the output of inverters 111 will be a logic zero causing the output of gate 113 to be a logic one. This signal is communicated along line L36 (FIG. 4) to inverter 115 (FIG. 5) resulting in a logic zero input to gate 117. The signal from circuit 19 input to gate 117 is logic one at this point in time resulting in a logic zero output at gate 117, which signal is denominated EQ ZERO on line L37. This signal is communicated to flip-flops 108 and 110 resetting each preparatory to the receipt of an additional message and the end of transmission thereof. Resetting flip-flop 110 terminates passage of the fast clock signals fA which leaves the data stored at the output of memory 76. The EQ ZERO reset signal on line L37 results in the output of a logic one on line 120 which is communicated to gate 46 resulting in a logic zero output at line 48, denominated the DATA READY or $DTF_k$ signal. This tells the stacker crane controller that a message is in memory preparatory to commanding the stacker crane controller to form a desired operation.

After completion of the serial input mode, the system must necessarily thereafter function in the parallel output mode. The DSF signal, originated at the stacker crane controller is communicated along line 136 to NAND gate 154. The input to gate 154 from flip-flop 164 indicates system is not in the serial output mode and places a logic one at that input. The DSF INHIBIT signal is also a logic one and indicates that the system is not in the serial input mode. Thus, all the inputs to gate 154 are high and the output is a logic zero. This signal is communicated as mentioned along line L1 to inhibit the serial input mode at AND gate 14 and to inverter 156 from thence along line 158 to enable gates 160 and 44. Since flip-flop 40 has been set at the end of transmission by a signal emanating from flip-flop 110 line 42 is at a logic one and line L28 at a logic zero. As a result, a logic one exists at the output of gate 160 along line L38, denominated the DO ENABLE and the output of gate 44 is a logic one along line 128 and 126, denominated the DI ENABLE signal, the third input DTIF to the gate 44 being a logic one as an input from the stacker crane controller. The signal on line 128 enables the gate 130 to pass the DTIP signal thereby generating the BUFFER CLOCK pulse on line 118 and clocking the counter down.

The DI ENABLE signal on line 126 (FIG. 3) is communicated to each of a series of NAND gates 119 (FIG. 4). This causes the data in the MOS segments of memory 76 to be passed to the stacker crane controller. The controller continues to execute the input/output instructions until the message within the memory 76 has been output at which time the counter 100 will be at zero. At this point in time the two inputs to gate 121 from counter 100 will each be a logic one resulting in a logic zero on line 134. This resets the UNIT BUSY and the DATA READY flip-flops 45 and 40 through gate 123. Thus, the DATA READY and UNIT BUSY signals become a logic one. This concludes the parallel output mode of operation.

The parallel input mode will now be described in detail. After determination that the unit is not busy and there is a requirement that data be communicated from the stacker crane controller to the central processing computer, the DSF signal in the form of a logic one is caused to appear on line 136 at one input to gate 154. Since the unit is not in the serial output mode, the input from flip-flop 164 to gate 154 is also at a logic one. The DSF INHIBIT is at a logic one also, indicative that the system is not in the serial input mode. Thus, a logic zero appears at the output of gate 154. As a consequence, the output of gate 160 at line L38, the DO ENABLE signal, is a logic zero and the DI ENABLE signal on line 126 from gate 44 a logic zero. In the manner described earlier communication of the logic zero output from gate 154 is communicated along line L1 to gate 14 to inhibit the serial input mode.

The logic zero appearing at line L38 is also communicated along line L162 through inverter 127 to enable NAND gate 140 to pass the DTOP signal from line 138 to line 142. This signal, a logic zero pulse, is communicated as one input to gate 71 and also as an input along line 144 to gate 92 and along line 146 to gate 148 for purposes yet to be explained. DO ENABLE signal along line L38 is communicated along L39 to enable the multiplexer 153 to pass information from a controller through the multiplexer 153 to the shift register 77 and 81 and from thence to the MOS segments of memory 76. The communication of controller data through the multiplexer 153 occurs because the DO ENABLE signal is caused to appear as a logic one on line L40 and a logic zero on line L41, the former signal being communicated to each gate 129 and the latter to each gate 131. Thus, the gates 131 are inhibited because of the one zero input and the gates 129 are enabled because of the one logic one input. Thus, the output of the gates 129 will be identical to the controller input to the same gate. Thus, the inputs to the gates 133 will either be a logic one and a logic zero or two logic zeros resulting in a logic zero or a logic one output, respectively. Each said multiplexer output from gates 133 is communicated to shift registers 77 and 81 and processed for storage and shifting to the output position in memory 76 as previously described. The DTOP signal passed through gate 140 (FIG. 3) and to gate 71 functions to increment flip-flops 108 and 110 in the same manner as described in conjunction with the signal appearing on line 88. The DTOP signal on line 142 and 144 creates the BUFFER CLOCK signal on line 118 and clocks up the counter 100 from line 98 as did the earlier described signal appearing on line 90 and the signal appearing on line 132 each of which are input to gate 92 at different times.

Also, the DTOP signal passed by gate 140 appears on line 146 as an input to gate 148, the other input to which is a logic one along line 180 resulting in a logic zero at the output along line 150, the signal being designated PE CLOCK signal. This signal is communicated from circuitry shown in FIG. 3 to that of FIG. 4 being input to each of the registers 77 and 81. At the same time, the DO ENABLE signal passed by gate 83 is communicated to the same two registers placing the registers in the parallel entry mode so that parallel data is clocked into the registers 77 and 81 by the PE CLOCK signal. Upon receipt of the end of transmission signal, which produces a logic one pulse at the output of gate 93 on line 122, which is communicated to flip-flop 164 and flip-flop 40. Because the DO ENABLE signal communicated to flip-flop 40 is zero, the logic one pulse appearing on line 122 produces no change in flip-flop 40. To the contrary, the output from flip-flop 164 at line L194 becomes a logic zero terminating the parallel input mode.

At this point in time, the system is in the serial output mode with the data received from the stacker crane controller stored in memory 76 at the output. Because gate 154 is inhibited, the DO ENABLE signal at line L38 is a logic one causing the signal appearing at line 40 (FIG. 4) to be a logic zero thus inhibiting the gates 129 and the signal appearing on line L41 to be a logic one thus enabling the gates 131. In this condition, signals may not pass from the controller of the stacker crane through the multiplexer 153 to shift registers 77 and 81 but rather information from memory 76 may be processed through gates 131 of the multiplexer 53 to the shift registers 77 and 81 the passage of signals through multiplexer 153 via gates 131 being essentially the same as the previously described passage via gates 129 of multiplexer 153. Thus, the data in memory 76 is presented at the parallel input terminals of the shift registers 77 and 81. In this condition, flip-flop 164 is clocked high while flip-flop 40 remains off. The logic zero on line L42 is also communicated as one input to gate 95 which puts the counter 100 into the down count mode. With the foregoing in mind, the output at line 194 from flip-flop 164 is at a logic one which is input to gate 137 and to flip-flop 135, the output of which is a logic one also communicated to gate 137 and also along 198 to gate 200. Thus, the output of gate 137 is a logic zero which is communicated along line 199 to NAND gate 14 thereby inhibiting the serial input mode. Said logic zero is passed through inverter 168 and is input to gate 172 at line 170. At this point in time, the optional line 190 is disconnected. Also, the input signal fB comprising logic one pulses are communicated along line L43 to NAND gate 172 resulting in logic zero clock pulses to shift register 174, which comprises a series of flip-flops. In this condition, the feedback line L44 communicates a logic zero signal through gate 139 to another input to the register 174. Thus, the shift register 174 is used as if it were a counter the initial state of each flip-flop being a logic zero and successively becoming a logic one until signal on line 144 becomes a logic one at which time the input from gate 139 becomes a logic zero and the register 174 is again loaded with zeros. At this point in time the output of gate 139 becomes a logic one which is communicated as an input to gate 92 resulting in the issuance of a BUFFER CLOCK signal on line 118 and counts the counter 100 down one increment.

As the shift register 174 is loaded with logic ones, the output on lines L45, L46, L47, L48, and L44 successively. When the state of line L45 is a logic one while the state of line L46 remains a logic zero, the two inputs to NAND gate 141 are high and the output a logic zero. This output constitutes the PEI signal communicated along line 178. This signal is inverted at 143 and, when input to gate 145 simultaneously with the input of a logic one clock pulse fB results in a logic zero output from gate 145 along line 180 to gate 148. The other input to gate 148, the DTOP signal passed by gate 144 will be a logic one causing a logic zero output pulse along line 150, the PE CLOCK pulse. The PEI and PE CLOCK signals are communicated to the memory 57 as hereinbefore explained in conjunction with FIG. 4. More specifically, the PEI pulse, a logic zero, in conjunction with the DO ENABLE signal which is a logic one, produces a logic one output from gate 83 which is input to the previously described register 77 and 81 placing these units in the parallel entry mode and allowing PE CLOCK signal to clock the data from memory 76 through gates 111, 131 and multiplexer 153 to the shift registers 77 and 81. The PEI signal is also communicated along line L49 to flip-flop 75 thereby resetting or placing it at a logic zero output condition.

With reference again to FIG. 3, once the state on line L46 to inverter 147 becomes a logic one, the output state of gate 41 is reversed and the PEI and PE CLOCK signals terminate. At this point in time, one input to gate 149 at line L50 is a logic zero while the signal from line L48 through inverter 151 is a logic one causing a logic one to appear on line L51. This is communicated as an input to gate 155 and also to gate 159 of the interface 10. This enables gate 155 to pass nine clocks along line 182, the SR SHIFT CLOCK signals to unload the data from memory 57 through inverter 157 (FIG. 4) along line 188, the TR DATA signals to the interface 10 (FIG. 3). The indicated signal on line L51 also enables gate 159 to pass the TR DATA. Thus, when each input to gate 159 is a logic one, the output is likewise a logic one which stops current flow through diode D5 thereby inhibiting optical transmission across the photocoupling member 161 to the photodetector P2.

This results in a logic zero being placed upon transmission line 8 to the central processing. In like manner, when the signal on line L51 becomes a logic zero, a logic one is communicated to transmission line 8. With the passage of time and additional incrementation of shift register 174 the signals on lines L46 and L48 become logic zeros causing both inputs to gate 149 to become logic ones and placing the output thereof at ground. This terminates issuance of SR SHIFT CLOCK signals resulting in two logic zero inputs to gate 158 allowing diode D5 to conduct thereby placing the transmission line at a logic one state. Once the counter 100 has decremented to zero, a logic zero appears at the output of gate 121 on line 134 placing a zero at the output of gate 123 which is communicated as an input to gate 163. The other input is at a logic one causing the output along line L52 to be at a logic zero. This signal is communicated to flip-flop 135 resetting the same. The same logic zero output from gate 123 resets the UNIT BUSY flip-flop 45 and flip-flop 164 thereby terminating the serial output mode. This results in a logic zero output from gate 168 terminating the clocking effect of register 174.

The hand shake mode of operation will now be described wherein the connector 190 of FIG. 3 is utilized. Specifically, once the register 174 has cycled once, the connector 190 is enabled thereby causing the flip-flop 135 to clock to a high output on line 198. This momentarily terminates through gates 137 and 168 clocking of the register 174. Also, the line L4, which connects with NAND gate 14 the system is momentarily placed in the serial input mode awaiting a one bit logic zero pulse from the transmission line 8. The same low state output from flip-flop 135 is communicated along line 198 as an input gate 200 which enables AND gate 58 to treat any lead to zero pulse on the transmission line as a noise pulse communicating a signal, a logic zero pulse via line L53 to gate 163 thereby resetting flip-flop 135 and causing the register 174 to cycle an additional time. In this way, difference in speeds of operation between the transceiver and peripheral equipment may be synchronized.

Reference is now made to FIG. 5 and particularly to the count down network 19 which originates clock pulses for the system. Input pulses to the count down network 19 originate with oscillator 26. Oscillator 26 comprises a crystal XTL to inverters 167 and 169, three capacitors C10, C11 and C12 and to resistors R9 and R10. Capacitors C10, C11 and C12 are tuning capacitors to maintain the desired frequency of oscillation at crystal frequency. Resistors R9 and R10 are bias resistors and the inverters 167 and 169 function as amplifiers with the resulting clock signal appearing at line L54 which is communicated as an input to gate 171 and fed back via line L55 to maintain oscillation. The gate 171 functions as a buffer, the clock pulses appearing at the output thereof being communicated via line L34 to shift register 99 of circuit 13 and via line L56 to a divide by ten counter 173. Counter 173 feeds a divide by sixteen counter 175 one output of which is inverted at 177 and comprises signal fA. One of the outputs of the counter 175 will be electrically coupled to the input L57 to divide by sixteen counter 179, depending upon the frequency output desired for a particular installation. Counter 179 outputs to divide by ten counter 181 from which an output signal, inverted at 183 becomes signal fB. Two outputs of counter 179 are input to gates 185 and 187, the latter through inverter 189. The outputs of gate 185 and 187 become signals phi A and phi B, each at ten times the frequency of fB. The described signals are used in the system as earlier described.

With continued reference to FIG. 5 and particularly the lower portion thereof, a watchdog timer circuit is illustrated. This circuit the failure to receive end of transmission signal within a prescribed interval of time where transmission apparently has stopped. More specifically, upon receipt during the serial input mode, the first character, the BT8 signal is generated as previously described and communicated to one shot multivibrator 191 causing the output thereof at line L58 to be a logic zero. The logic one pulse BT8 is at the same time communicated via line L59 to flip-flop 193. Clocking the same to a high state at line L60 and a low state at L61. This is the DSF INHIBIT signal which is processed to gate 154 (FIG. 3) to inhibit the parallel input and parallel output modes. With line L60 at a logic one and L58 at a logic zero, the output from gate 195 is a logic one which comprises the SET EOT signal which is communicated along line L62 to gate 71 and flip-flop 108. In this condition, flip-flops 108 and 110 continue to await an end of transmission signal.

With the appearance of each BT8 signal for each character received, the described condition of multivibrator 191 is refreshed. However, if the BT8 signal is discontinued, the one shot 191 will time out placing a logic one on line L58 and creating a logic zero on line L62. This is communicated as mentioned to gate 71 and flip-flop 108 causing flip-flops 108 and 110 to treat that communication as if it were an end of transmission signal.

If in the meantime, the EOT CLOCK signal is received at line L63, upon passing gate 197, reset flip-flop 193 causing a logic zero to appear on line L60 thereby maintaining a logic one along line L62. At the same time, the parallel mode on line L61 is changed to a logic one (the DSF INHIBIT signal) allowing the system to function in the parallel input or parallel output mode. The described watchdog timer circuit may be reset to its initial condition by election of the operator to transmit the SYRT signal to gate 199. This clears flip-flop 193.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Circuitry for preventing the use of erroneous data in a transceiver for controlling computerized stacker cranes comprising:
    means receiving serial incoming signals comprising data bits and control bits including a lead control bit;
    memory means for storing at least some of said control bits and all said data bits;
    voting circuitry in communication with said memory means and to which said data bits and at least some of the control bits are communicated, said voting circuitry comprising signal comparator means;
    sampling circuitry in communication with the voting circuitry and to which the lead control bit is communicated, said sampling circuitry comprising means subdividing the lead control bit into sub-parts, delay sampling means for examining intermediate sub-parts of the lead control bit and clocking the voting circuitry when the state of said intermediate sub-parts comprise a predetermined state, and means for thereafter clocking the voting circuitry causing the signal comparator means to vote on all said data bits and at least some of the control bits, whereby approved bits are communicated to said memory means, and means turning off the voting circuitry when the state of said lead control bit is other than said predetermined state.

2. Circuitry according to claim 1 further comprising counter means comprising means which determine the number of bits communicated to said receiving means and means discontinuing the clocking of the voting circuitry by the sampling circuitry after a predetermined number of bits have been so counted.

* * * * *